United States Patent [19]

Latham

[11] 4,011,849
[45] Mar. 15, 1977

[54] COMBINED ENGINE AND MUFFLER COMPARTMENT

[75] Inventor: David Dennis Latham, Dubuque, Iowa

[73] Assignee: Deere & Company, Moline, Ill.

[22] Filed: Feb. 5, 1976

[21] Appl. No.: 655,519

[52] U.S. Cl. ............... 123/198 E; 123/41.64; 181/33 K; 165/51; 165/128

[51] Int. Cl.² .................................. F02B 77/00

[58] Field of Search ........ 123/198 E, 195 C, 195 S, 123/195 R, 142, 41.64; 181/33 K; 165/51, 128

[56] References Cited
UNITED STATES PATENTS

| | | | |
|---|---|---|---|
| 2,123,358 | 7/1938 | Grutzner | 123/198 E |
| 2,177,687 | 10/1939 | Bracken et al. | 123/198 E |
| 2,355,208 | 8/1944 | Devol et al. | 181/33 K |
| 3,666,042 | 5/1972 | Cederbaum | 181/33 K |
| 3,684,053 | 8/1972 | Fachbach et al. | 123/198 E X |
| 3,856,439 | 12/1974 | Moehrbach | 181/33 K X |
| 3,866,580 | 2/1975 | Whitehurst et al. | 123/41.64 X |
| 3,924,597 | 12/1975 | Hatz et al. | 123/198 E |

*Primary Examiner*—C. J. Husar
*Assistant Examiner*—Ira S. Lazarus

[57] ABSTRACT

An internal combustion engine is mounted so as to be vibration isolated. The engine supports a muffler and muffler heat shield assembly, the latter forming part of a combined engine and muffler compartment and being constructed such that the engine exhaust acts to pull ambient air into the compartment, about the muffler and out of an exhaust duct in the top of the heat shield assembly. The compartment also includes a noise baffle for preventing sound waves from travelling directly from the engine and muffler to openings provided for permitting ambient air to enter the compartment.

5 Claims, 2 Drawing Figures

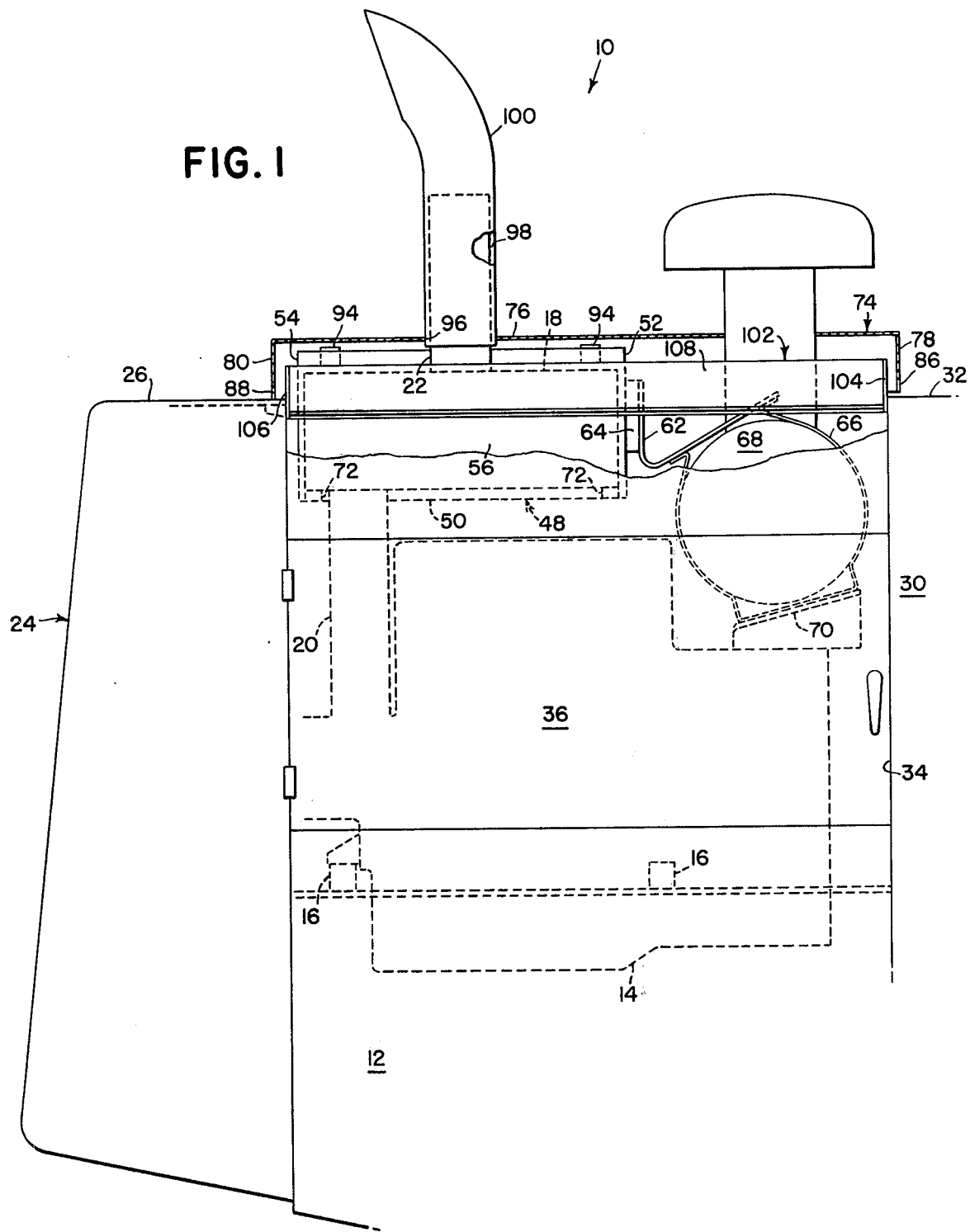

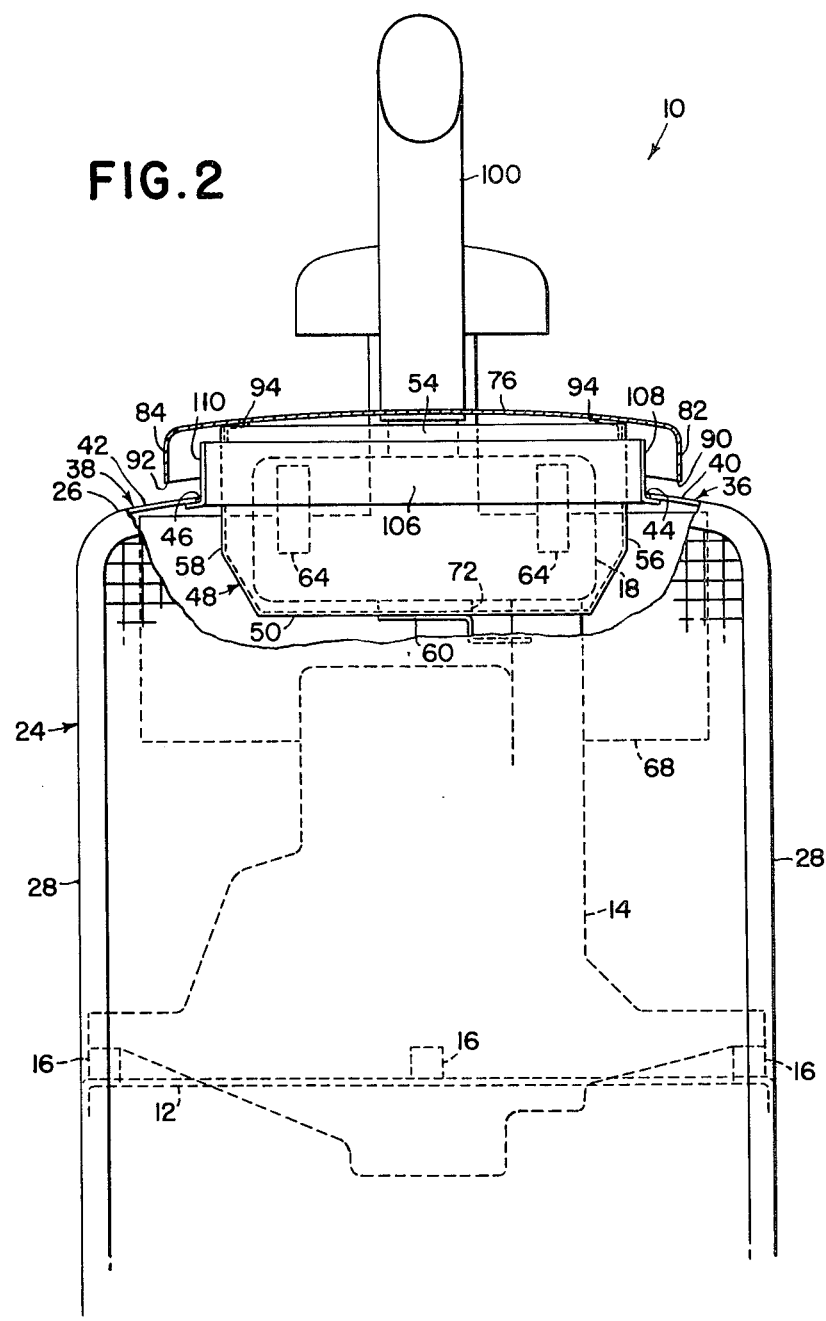

COMBINED ENGINE AND MUFFLER COMPARTMENT

BACKGROUND OF THE INVENTION

The present invention relates to a combined engine and muffler compartment.

The idea of placing the muffler of a tractor-type vehicle in the same compartment that houses the engine is not new with designers. However, because the muffler radiates a great amount of heat, care must be taken in the construction of such compartments lest the cooling requirement of the engine exceed the capacity of the engine cooling system.

SUMMARY OF THE INVENTION

According to the present invention there is provided a novelly constructed compartment for the engine and muffler of a motor vehicle.

One object of the invention is to provide, in a compartment for housing an engine and its muffler, a heat shield for directing a flow of ambient air about the muffler and for preventing the direct radiation of heat from the muffler to the engine.

Another object of the invention is to provide a compartment including a muffler heat shield constructed so as to form a part of the top of the compartment.

Still another object of the invention is to provide a compartment including a muffler heat shield which is supported, together with the muffler from the engine, which is isolated from the vehicle frame by resilient mounts.

Yet another object of the invention is to provide a compartment constructed so as to attenuate sound waves radiating from the engine and muffler.

These and other objects will become apparent from a reading of the ensuing description taken together with the appended drawings.

BRIEF DESCRIPTION OF THE DRAWINGS

FIG. 1 is a somewhat schematic right side elevational view of a tractor type vehicle and shows an engine and muffler located in a compartment constructed according to the principles of the present invention.

FIG. 2 is a somewhat schematic rear elevational view of the tractor type vehicle, shown in FIG. 1.

DESCRIPTION OF THE PREFERRED EMBODIMENT

The present invention has application to every sort of tractor using an internal combustion engine for its motive power and for the purposes of this application the invention is discussed with reference to being embodied in a tractor of the type including a rear-mounted engine.

Thus, referring to the drawings, therein is shown a rear portion of a tractor 10. The tractor 10 includes an engine support frame 12 and an internal combustion engine 14 is connected to the frame 12 by a plurality of mounts 16 (here shown schematically) of a conventional type including resilient portions acting to prevent the transmission of vibrations from the frame 12 to the engine 14.

Spaced above the engine and disposed generally horizontally is an exhaust muffler 18 having an inlet pipe 20 coupled to an exhaust outlet of the engine 14 and having an outlet pipe 22 projecting upwardly and located on the fore-and-aft centerline of the tractor 10.

Supported on the frame 12 rearwardly of the engine 14 is a grille housing 24 including a top wall 26 and opposite side walls 28. A hydraulic fluid reservoir 30 (only partly shown) is supported on the frame 12 just forwardly of the engine 14 and has a top wall 32 and a transverse rear wall 34. Right and left side panels 36 and 38, respectively, are positioned at opposite sides of the engine 14 and extend between the grille housing 24 and the reservoir 30. The panels 36 and 38 extend upwardly from the frame 12 and respectively include upper inwardly curved portions 40 and 42, the curved portions 40 and 42 respectively terminating at longitudinal edges 44 and 46. The side panels may be held in place by any conventional means (not shown) such as bracketry secured to the frame 12 and/or to the grille housing 24 and the reservoir 30.

A heat shield assembly is provided to intercept and reflect heat radiated from the muffler 18 and is constructed in such a way as to prevent the engine 14 from becoming unduly heated by the muffler 18. Specifically, the heat shield assembly includes a lower shield section 48 generally in the form of a box having an open top located above the level of the tops of the grille housing 24, reservoir 30 and side panels 36 and 38. The shield section 48 includes a horizontal bottom wall 50, vertical transverse front and rear end walls 52 and 54, respectively, and right and left upright longitudinal side walls 56 and 58, respectively. The shield section 48 is supported from the engine 14 through means including a first bracket 60 connected between the engine 14 and a central rearward location of the bottom wall 50, and by a pair of transversely spaced brackets 62 (only one shown) respectively connected between a pair of mounting blocks 64 fixed to the end walls 52 and a pair of air cleanser support bands 66 (only one shown), which grip the periphery of an air cleaner 68 and are respectively secured to the engine 14 by a pair of mounts 70 (only one shown). Thus, it will be appreciated that the shield section 48 is in effect supported from the engine 14 at three points.

The muffler 18 is located within the shield section 48 and has its shell held in spaced relationship to the walls of the shield section 48 through means of a pair of longitudinally spaced spacer members 72 secured to the lower side of the muffler shell and the upper side of the bottom wall 50. The muffler inlet pipe 20 is tightly received in a hole provided in the wall 50 of the shield section 48 while the outlet pipe 22 projects upwardly through the open top of the shield section 48.

The heat shield assembly further includes an upper shield section 74 generally in the form of an inverted tray including a top wall 76 from which depend transverse front and rear end walls 78 and 80, respectively, and right and left longitudinal side walls 82 and 84. The shield section 74 is positioned and dimensioned such that the top wall 76 is spaced just above the open top of the lower shield section 48, while respective lower edges 86 and 88 of the end walls 78 and 80 are respectively spaced above the top walls 32 and 26 of the reservoir 30 and grille housing 24, and respective lower edges 90 and 92 of the side walls 82 and 84 are respectively spaced above the side panels 36 and 38 and outwardly of their respective inward edges 44 and 46. Thus a space is provided between the upper shield section 74 and the reservoir 30, grille housing 24 and side panels 36 and 38 to permit the ingress of ambient air for a purpose to be described below.

The shield section 74 is held in place by four brackets 94 fixed to the lower shield section 48 adjacent the corners of the open top thereof and fixed to the underside of the top wall 76. The top wall 76 is provided with a circular opening 96, which receives the outlet pipe of the muffler 18 and is dimensioned such that an annular space 98 exists between the edge of the opening 96 and the pipe 22. Fixed, as by weldment, to the edge of the opening 96 in spaced concentric relationship to the pipe 22 is an exhaust pipe 100. It will be appreciated then that the flow of exhaust gases from the pipe 22 will cause air to be drawn upwardly or aspirated through the clearance between the pipe 22 and exhaust pipe 100. This flow of air will cause ambient air to enter beneath the upper shield section 74 and flow over the muffler 18 to carry away heat radiated therefrom and reflected by the lower shield section 48.

Provided for attenuating sound waves generated by the engine 14 and the muffler 18 is a generally rectangular baffle 102 located within the confines of and extending above and below the level of the bottom of the upper shield section 74. The baffle 102 includes an upright forward end 104 fixed to the rear wall 34 of the reservoir 30, an upright rear end 106 fixed to the forward side of the grille housing 24 and right and left upright sides 108 and 110 which extend between the ends 104 and 106 and are located so as to be engaged with the inward edges 44 and 46 of the upper curved portions 40 and 42 of the side panels 36 and 38. While the baffle 102 is here shown constructed in a single piece, for the purposes of longitudinal adjustment and ease in installation it may be made of two U-shaped members, with the bight of one member being fixed to the reservoir and the bight of the other member fixed to the grille housing and with the legs of the one member extending toward the grille housing and with the legs of the second member extending toward the reservoir and fixed to the legs of the one member.

Thus, it will be appreciated that the grille housing 24, reservoir 30, side panels 36 and 38, heat shield sections 48 and 74 and the baffle 102 cooperate to define a compartment or enclosure for the engine 14 and the muffler 18.

In operation, the lower heat shield section 48 acts to intercept heat radiated downwardly and horizontally by the muffler 18 while the upper heat shield section 74 acts to intercept heat radiated upwardly by the muffler 18. The flow of exhaust gases from the exhaust pipe 100 acts to draw ambient air in beneath the upper heat shield section 74 and over the muffler 18 and upwardly through the annular space 98 between the outlet pipe 22 and the exhaust pipe 100. This flow of ambient air serves to carry away heat generated by the muffler 18.

In addition to acting as heat shields, the shield sections 48 and 74 also act to deflect sound waves generated by the muffler 18. Also, the baffle 102 acts to prevent straight-line movement of sound waves beneath the upper shield section 74 so as to lessen the amount of noise that passes from the engine and muffler compartment.

Of significance is the fact that the muffler 18 and the upper and lower heat shield sections 48 and 74 are supported on the engine 14 since the latter is isolated, by virtue of the mounts 16, from the vibrations induced in the frame 12 during operation. Further, all components mounted on the engine 18 move together with the engine 18, thus making it unnecessary to allow for relative movement between associated ones of the components as would be necessary if some components were frame-supported and others engine-supported.

I claim:

1. In a vehicle having an engine support frame, an internal combustion engine connected to the frame by a plurality of engine mounts having the capability of preventing vibrations from being transmitted to the engine from the frame, a muffler having a generally horizontally disposed shell spaced above the engine and having inlet and outlet pipes respectively projecting downwardly and upwardly from the shell with the inlet pipe being conneted to the engine, and a compartment substantially enclosing the muffler and engine, the improvement comprising said compartment including edge means defining an opening located above the engine and having an upper portion of the muffler shell located therein; an upper heat shield section spaced above said opening and being dimensioned so as to overlap said edge means in its entirety; said upper heat shield section having an opening therein; an exhaust pipe fixed to the upper heat shield section in communication with said opening; said outlet pipe projecting into said exhaust pipe and being spaced therefrom so as to leave an annular space between the exhaust and outlet pipes; a lower heat shield section in the form of a box having an open top located beneath said upper heat shield section and having the muffler shell located therein; and means supporting said upper and lower heat shield sections on said engine exclusive of said frame.

2. The vehicle defined in claim 1 wherein said compartment is defined in part by a grille housing and a hydraulic reservoir respectively located adjacent opposite ends of the engine; said edge means including an upper transverse edge of the grille housing and an upper transverse edge of the reservoir; and a baffle means extending between and fixed to the grille housing and reservoir and including upright wall means located adjacent to and extending above and below the entire edge means.

3. The vehicle defined in claim 2 wherein said compartment is defined in part by a pair of upright side panels disposed on the opposite sides of the engine and extending fore-and-aft between the grille housing and reservoir and respectively including upper inwardly extending portions termination in respective fore-and-aft extending edges cooperating with the transverse edges of the grille housing and reservoir to define said edge means; and said upper heat shield section being in the form of an inverted tray having a top wall from which opposite end walls depend, respectively above the grille housing and reservoir, and opposite side walls depend, respectively above the upper inwardly extending portions of the opposite side panels.

4. The vehicle defined in claim 1 wherein an air cleaner is located in the compartment adjacent one end of the lower heat shield section and is connected directly to the engine by a mounting means; and said means supporting the upper and lower heat shield sections on the engine including a first bracket connected directly between the engine and an underside portion of the lower heat shield section adjacent an end thereof which is opposite from said one end; and bracket means connected between said one end and the mounting means connecting the air cleaner to the engine.

5. The vehicle defined in claim 1 wherein said upper heat shield section is fixed to an upper portion of the lower heat shield section.

* * * * *